(12) United States Patent
Yanagi (10) Patent No.: US 8,703,841 B2
(45) Date of Patent: Apr. 22, 2014

(54) INK COMPOSITION, INK SET AND IMAGE FORMING METHOD

(75) Inventor: Terukazu Yanagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 220 days.

(21) Appl. No.: 13/172,900

(22) Filed: Jun. 30, 2011

(65) Prior Publication Data

US 2012/0026239 A1 Feb. 2, 2012

(30) Foreign Application Priority Data

Jul. 27, 2010 (JP) .................................. 2010-168531

(51) Int. Cl.
| | | |
|---|---|---|
| B05D 5/00 | (2006.01) | |
| B29C 33/60 | (2006.01) | |
| B29C 47/00 | (2006.01) | |
| B41J 2/01 | (2006.01) | |
| B41J 2/17 | (2006.01) | |
| B41J 2/175 | (2006.01) | |
| C08J 3/22 | (2006.01) | |
| C08K 5/01 | (2006.01) | |
| C08K 5/20 | (2006.01) | |
| C08L 23/00 | (2006.01) | |
| C08L 91/06 | (2006.01) | |
| C08L 91/08 | (2006.01) | |
| C09D 5/00 | (2006.01) | |
| C09D 11/00 | (2006.01) | |
| D21H 17/35 | (2006.01) | |
| D21H 19/18 | (2006.01) | |
| G01D 11/00 | (2006.01) | |

(52) U.S. Cl.
USPC ............... 523/160; 106/31.13; 106/31.25; 106/31.29; 106/31.3; 106/31.31; 106/31.35; 106/31.43; 106/31.6; 106/31.61; 106/31.62; 106/31.63; 106/31.67; 106/31.75; 347/1; 347/85; 347/95; 347/100; 347/102; 427/256; 427/288; 523/161; 524/227; 524/229; 524/230; 524/232; 524/277; 524/478; 524/479; 524/480; 524/487

(58) Field of Classification Search
USPC .......... 347/1, 85, 95, 100, 102; 427/256, 288; 106/31.13, 31.25, 31.29, 31.6, 31.61, 106/31.3, 31.31, 31.35, 31.43, 31.62, 31.63, 106/31.67, 31.75; 523/160, 161; 524/277, 524/478, 479, 480, 227, 229, 230, 232, 487
See application file for complete search history.

(56) References Cited

U.S. PATENT DOCUMENTS

| | | |
|---|---|---|
| 5,345,254 A | 9/1994 | Wong et al. |
| 2009/0087565 A1* | 4/2009 | Houjou ........................ 427/256 |
| 2010/0086692 A1 | 4/2010 | Ohta |

FOREIGN PATENT DOCUMENTS

| | | |
|---|---|---|
| JP | 2001-138629 | 5/2001 |
| JP | 2003-261805 A | 9/2003 |
| JP | 2007-162442 | 6/2007 |
| JP | 2007-277290 A | 10/2007 |
| JP | 2007277290 A | 10/2007 |
| JP | 2008-213483 | 9/2008 |
| JP | 2010-090266 | 4/2010 |
| WO | 2009060972 A | 5/2009 |

OTHER PUBLICATIONS

Machine English translation of JP 2007-277290, Tetsuya, Oct. 2007.*
Author unknown, the table from http:www.mitsuichem.com/service/polyurethane/coatings/chemipearl/pdf/pict_spec003.pdf, date unknown, printed by examiner on Nov. 1, 2013.*
Author unknown, Special Chemicals for Industries Products Catalog, "Nopcote PEM-17, Lubricant for Coating Color", date unknown, printed by examiner on Nov. 1, 2013.*
Partial English language translation of the following: Office action dated Dec. 17, 2013 from the Japanese Patent Office in a Japanese patent application corresponding to the instant patent application. This office action translation is submitted now in order to supplement the understanding of patent document JP 2010-090266, JP2007-162442, JP2001-138629 and JP 2008-213483 which are cited in the office action and are being disclosed in the instant information Disclosure Statement.

* cited by examiner

*Primary Examiner* — Patrick Niland
(74) *Attorney, Agent, or Firm* — SOLARIS Intellectual Property Group, PLLC (57) ABSTRACT

The invention provides an ink composition comprising a colorant, water and wax particles, the wax particles comprising at least two kinds of wax; an ink set including the ink composition; and a method of forming an image using the ink composition.

9 Claims, 1 Drawing Sheet

INK COMPOSITION, INK SET AND IMAGE FORMING METHOD

CROSS-REFERENCE TO RELATED APPLICATION

This application claims priority under 35 USC 119 from Japanese Patent Application No. 2010-168531 filed Jul. 27, 2010, the disclosure of which is incorporated by reference herein.

BACKGROUND OF THE INVENTION

1. Technical Field

The present invention relates to an ink composition, an ink set, and an image forming method.

2. Related Art

An inkjet recording method is a method of performing recording by ejecting ink in the form of liquid droplets from a number of nozzles provided in an inkjet head. The inkjet recording method is widely used since high quality images can be recorded on various recording media by the method.

In black inks for inkjet recording, carbon black pigment is used. On the other hand, for color inks, water-soluble dyes are mainly used and improvement in weather resistance (for example, light-fastness, ozone resistance and water resistance) of the water-soluble dyes is desired. Considering application of the water-soluble dyes to the field of printing, improvement in weather resistance is especially important. Pigments, having a high crystallinity, are superior to dyes especially in light fastness and water resistance. However, there are still problems to be addressed in that storage stability of pigment inks is insufficient, and that rubbing resistance of a printed matter may decrease due to pigment particles remaining on the surface of a recording medium.

As a technique for improving rubbing resistance of a recorded image, an ink composition which contains water, a pigment covered with a water-insoluble polymer, and at least two kinds of wax having different average particle diameters, is disclosed (for example, see Japanese Patent Application Laid-Open (JP-A) No. 2007-277290).

Further, as a technique for improving rubbing resistance of a recorded matter, an ink composition which contains an alkali-soluble copolymer, water, a colorant and a wax, the alkali-soluble copolymer having a pH being adjusted so that the alkali-soluble copolymer is water-soluble by inorganic base and having an acid value of 40 or less, is disclosed (for example, see JP-A No. 2003-261805).

However, although the ink composition of JP-A No. 2007-277290 may improve rubbing resistance of a recorded image as a result of adding two kinds of waxes having different average particle diameters, the obtained recorded image is yet to be improved in terms of blocking resistance immediately after the printing.

Moreover, although the ink composition of JP-A No. 2003-261805 may improve rubbing resistance of recording paper for inkjet recording, there is room to be improved in rubbing resistance of other recording media such as plain paper.

The present invention is made in view of the aforementioned background, and one object of the present invention is to provide an ink composition which is capable of forming an image having excellent temporal storage stability and having excellent blocking resistance immediately after the printing; an ink set employing the ink composition; and an image forming method using the ink composition.

SUMMARY OF THE INVENTION

A first aspect of the invention provides an ink composition including a colorant, water and wax particles, the wax particles including at least two kinds of wax.

A second aspect of the invention provides an ink set including the ink composition.

A third aspect of the invention provides a method of forming an image using the ink composition.

DETAILED DESCRIPTION OF THE INVENTION

Ink Composition

The ink composition of the invention includes a colorant, water, and wax particles including at least two kinds of wax.

The ink composition of the invention may exhibit favorable temporal storage stability, and may enable formation of an image that exhibits favorable blocking resistance immediately after the image formation.

Specifically, it was found that the blocking resistance immediately after the image formation may be remarkably improved by including, in the form of wax particles, at least two kinds of wax in the ink composition. That is, by combining a wax having a greater specific gravity with a wax having a smaller specific gravity, which tend to exist disproportionately at a liquid surface and separate in an ink composition over time to affect storage stability of the ink composition, separation of the wax in the ink composition may be effectively suppressed and storage stability of the ink composition may be remarkably improved. As a result, storage stability of the ink itself may be maintained while improving block resistance of an image immediately after the formation.

Wax Particles

The ink composition of the invention includes wax particles containing at least two kinds of wax.

In the invention, the "wax particles" refer to particles in which at least two kinds of wax exist as a mixture.

The at least two kinds of wax preferably have different specific gravities from each other, in view of improving ink storage stability.

The specific gravity of one of the at least two kinds of waxes (hereinafter, also referred to as "wax 1") is preferably 0.95 or less, more preferably in the range of from 0.89 to 0.95, and particularly preferably in the range of from 0.89 to 0.91. When the specific gravity of wax 1 is equal to or smaller than 0.95, the blocking resistance immediately after the image formation may be remarkably improved.

The specific gravity of another wax (hereinafter, also referred to as "wax 2") is preferably over 0.95, more preferably in the range of from more than 0.95 and 1.00 or less, and particularly preferably in the range of from 0.97 to 1.00. When the specific gravity of wax 2 is more than 0.95, dispersibility of the ink composition may be improved and storage stability may be remarkably improved.

In a preferred combination of the waxes, the specific gravity of the wax 1 is 0.95 or less, more preferably in the range of from 0.89 to 0.95, particularly preferably in the range of from 0.89 to 0.91, and the specific gravity of wax 2 is over 0.95, more preferably in the range of from more than 0.95 and 1.00 or less, and particularly preferably in the range of from 0.97 to 1.00.

When the ink composition include a combination of waxes as mentioned above, separation of the wax in the ink composition may be effectively suppressed, and both the dispersibility and the storage stability of the ink composition may be improved.

The difference between the specific gravities of the waxes is preferably in the range of from 0.05 to 0.15, more preferably in the range of from 0.05 to 0.11, and particularly preferably in the range of from 0.07 to 0.11, in view of improving the storage stability of the ink composition.

Examples of the waxes that may be used in the invention include natural waxes and synthetic waxes.

Examples of the natural wax include petroleum waxes, vegetable waxes, and animal waxes. Examples of the petroleum wax include a paraffin wax, a microcrystalline wax, and a petrolatum. Examples of the vegetable wax include carnauba wax, candelilla wax, rice wax, and Japan tallow. Examples of the animal wax include lanolin and bees wax.

Examples of the synthetic wax include a synthetic hydrocarbon wax and a modified wax. Examples of the synthetic hydrocarbon wax include a polyethylene wax and a Fischer-Tropsch wax, and examples of the modified wax include a paraffin wax derivative, a montan wax derivative, a microcrystalline wax derivative, and a fatty acid amide wax derivative.

Among these waxes, wax 1 is preferably at least one selected from the petroleum wax or the synthetic wax, more preferably at least one selected from a paraffin wax or a polyethylene wax, and particularly preferably at least one selected from a paraffin wax, in view of structural similarity to wax 2, storage stability of the ink composition, blocking resistance of an image immediately after the image formation, and improvement of rubbing resistance of an image.

Wax 2 is preferably at least one selected from the vegetable wax or the fatty acid amide wax, more preferably at least one selected from carnauba wax or a stearic acid amide wax, and particularly preferably at least one selected from carnauba wax, in view of structural similarity to wax 1, storage stability of the ink composition, blocking resistance of an image immediately after the image formation, and improvement of rubbing resistance of an image.

Among these, the combination of wax 1 and wax 2 is preferably a combination of one selected from a paraffin wax or a polyethylene wax and one selected from carnauba wax or a stearic acid amide wax. The combination is particularly preferably a combination of a paraffin wax and carnauba wax, in view of storage stability of the ink composition, blocking resistance of an image immediately after the image formation, and improvement of rubbing resistance of an image.

The wax particles are not particularly limited as long as each particle includes at least two kinds of waxes, and may be prepared by any method among methods including conventional ones.

The wax particles may be preferably added in the form of a dispersion (particularly preferably an emulsion).

The wax particles may be preferably wax particles obtained by co-emulsification of at least two kinds of waxes in view of storage stability of the ink composition, blocking resistance of an image immediately after the image formation, and improvement in rubbing resistance of an image.

Preparation of the wax particles by way of co-emulsification is explained hereinafter.

Exemplary methods include, in general, a wet milling process, in which an aqueous wax dispersion is obtained by adding a surfactant, a dispersant or the like, and crushing an oily phase in an aqueous phase by applying a mechanical force with a colloid mill or the like; an emulsification process, in which an aqueous dispersion is obtained by emulsifying an oily phase having a temperature of not less than the melting point in a water bath having a temperature of not less than the melting point of the oily phase, by applying a high shearing force with a homogenizer, and then cooling; and the methods described in TSUJI Susumu, "*Techniques of Emulsification and Solubilization*" pp. 92-104 (1976) (published by Kogaku Tosho Co.), JP-A No. 2002-18254, and the like. The wax particles in the invention may be prepared by using at least two kinds of waxes as an oily phase.

The volume average particle diameter of the wax particles may be preferably in the range of from 10 nm to 200 nm, more preferably in the range of from 30 nm to 150 nm, and further preferably in the range of from 50 nm to 100 nm, in view of storage stability of the ink composition.

The volume average particle diameter of the wax particles can be measured by using a particle size distribution measurement apparatus using light scattering or the like, and the values described in the present specification is that measured with NANOTRAC UPA EX150, trade name, manufactured by Nikkiso Co., Ltd.

The content of the wax particles may be preferably in the range of from 0.1% by mass to 10% by mass, more preferably in the range of from 0.1% by mass to 5% by mass, and particularly preferably in the range of from 1% by mass to 4% by mass, in terms of the solid content concentration of the wax particles with respect to the total mass of the ink composition, in view of improvements in storage stability of the ink composition, blocking resistance of an image immediately after the image formation, rubbing resistance of an image, and ink ejectability (immediately after the preparation and with the lapse of time).

The mass ratio of the waxes (wax 1:wax 2) may be preferably in the range of from 1:4 to 4:1, more preferably in the range of from 1:2 to 2:1, and further preferably in the range of from 1:2 to 1:1.

When the ratio of wax 1 with respect to wax 2 is increased, although blocking resistance of an image immediately after the image formation and rubbing resistance of an image tend to be improved, separation resistance (an ability of suppressing separation) of the ink composition tends to deteriorate. The separation resistance may be favorable when the mass ratio of wax 1 with respect to wax 2 is 4:1 or less, and the separation resistance may be remarkably favorable when the mass ratio of wax 1 with respect to wax 2 is 3:1 or less.

When the ratio of wax 1 with respect to wax 2 is decreased, rubbing resistance and blocking resistance of an image tend to deteriorate, but separation resistance of the ink composition tends to be improved.

Colorant

The ink composition of the invention includes at least one colorant.

Known dyes and pigments and the like may be used as the colorant, without particular restrictions. In particular, colorants that are substantially insoluble in water or hardly soluble in water are preferable from the viewpoint of the tinctorial strength with respect to the ink. Specifically, examples include various pigments, disperse dyes, oil-soluble dyes, and colorants that form J-aggregates. Among these, pigments are more preferable.

In the invention, water-soluble pigments per se or pigments that have been surface-treated with a dispersant may be used as the colorant.

The term "water-insoluble" as used herein refers to a property of showing a solubility of 5.0 parts by mass or less when dissolved in 100 g of water at 25° C.

(Pigment)

The type of the pigment in the invention is not particularly limited, and conventional known organic and inorganic pigments may be used. Examples of organic pigments include azo lakes, azo pigments, polycyclic pigments such as phthalocyanine pigments, perylene pigments, perinone pigments, anthraquinone pigments, quinacridone pigments, dioxazine pigments, diketopyrrolopyrrole pigments, thioindigo pigments, isoindolinone pigments, and quinophthalone pigments, dye lakes such as basic dye lakes and acidic dye lakes, nitro pigments, nitroso pigments, aniline black, and daylight fluorescent pigments. Examples of inorganic pigments include titanium oxide, iron oxide pigments, and carbon black pigments. Pigments that are not described in the Color Index may be used if they are dispersible in an aqueous phase. Further examples of pigments that may be used include those obtained by surface-treating the above pigments with a surfactant or a polymeric dispersant, and graft carbon. Of these pigments, preferable pigments for use include azo pigments, phthalocyanine pigments, anthraquinone pigments, quinacridone pigments, and carbon black pigments. Specific examples thereof include the pigments described in JP-A No. 2007-100071.

(Dispersant)

When the colorant in the ink composition of the invention is a pigment, it is preferable that colorant particles containing the colorant covered with a dispersant are dispersed in an aqueous medium. The dispersant may be a polymeric dispersant or a low-molecular surfactant dispersant. The polymeric dispersant for dispersing the colorant is preferably a water-insoluble polymeric dispersant (hereinafter, simply referred to as "dispersant"). The water-insoluble polymer is not particularly limited as long as it is capable of dispersing a colorant (particularly, a pigment), and conventional known water-insoluble polymeric dispersants may be used. The water-insoluble polymeric dispersant may include, for example, both a hydrophobic structural unit and a hydrophilic structural unit.

Examples of a monomer for forming a hydrophobic structural unit include styrenic monomers, alkyl(meth)acrylates, and aromatic-group-containing (meth)acrylates.

The monomer for forming a hydrophilic structural unit is not particularly limited as long as it contains a hydrophilic group. Examples of the hydrophilic group include a nonionic group, a carboxyl group, a sulfonic acid group, and a phosphoric acid group. The nonionic group has the same definition as the nonionic hydrophilic groups of the self-dispersing polymer described below.

From the viewpoint of dispersion stability, the hydrophilic structural unit in the invention preferably contains at least a carboxyl group, and it is also preferable that the hydrophilic structural unit contains both a nonionic group and a carboxyl group.

Examples of the water-insoluble polymeric dispersant include a styrene-(meth)acrylic acid copolymer, a styrene-(meth)acrylic acid-(meth)acrylic ester copolymer, a (meth)acrylic ester-(meth)acrylic acid copolymer, a polyethyleneglycol (meth)acrylate-(meth)acrylic acid copolymer, and a styrene-maleic acid copolymer. Here, the term "(meth)acrylic acid" refers to acrylic acid or methacrylic acid.

In the invention, the water-insoluble polymeric dispersant is preferably a vinyl polymer containing a carboxyl group, and more preferably a vinyl polymer containing at least a structural unit derived from an aromatic-group-containing monomer as a hydrophobic structural unit and a carboxyl-group-containing structural unit as a hydrophilic structural unit.

The weight average molecular weight of the water-insoluble polymeric dispersant is preferably from 3,000 to 200,000, more preferably from 5,000 to 100,000, further preferably from 5,000 to 80,000, and particularly preferably from 10,000 to 60,000, from the viewpoint of dispersion stability of a pigment.

The content of the dispersant in the colorant particles is preferably from 5% by mass to 200% by mass, more preferably from 10% by mass to 100% by mass, and particularly preferably from 20% by mass to 80% by mass, with respect to the colorant (for example, pigment), from the viewpoints of dispersibility, tinctorial properties, and dispersion stability of the colorant (for example, pigment).

The colorant particles may include another dispersant, in addition to the water-insoluble polymeric dispersant. For example, conventional known water-soluble low-molecular dispersants, water-soluble polymers, and the like may be used. The content of dispersants other than the water-insoluble polymeric dispersant may be within the above content range for the dispersant.

(Other Additives)

Other additives, such as a basic substance (neutralizing agent), a surfactant or the like may be added to the colorant particles, as necessary.

(Basic Substance)

A neutralizing agent (an organic base or an inorganic alkali) may be used as the basic substance. The basic substance may be added such that the pH of the composition containing the dispersant is adjusted to be from 7 to 11, more preferably from 8 to 10.

The content of the basic substance is preferably from 50% by mol to 150% by mol, more preferably from 70% by mol to 120% by mol, and particularly preferably from 80% by mol to 100% by mol, with respect to 100% by mol of ionic groups of the dispersant.

(Preparation Method of Colorant Particle Dispersion)

The colorant particles can be obtained as a colorant particle dispersion by dispersing a mixture containing, for example, a pigment, a dispersant, an optional solvent (preferably an organic solvent) and the like, using a disperser.

The colorant particle dispersion is preferably prepared by: mixing a solution which contains water as a main component and further contains a pigment, a dispersant, an organic solvent capable of dissolving or dispersing the dispersant, and a basic substance (a mixing and hydration process); and removing the organic solvent (a solvent removal process).

This method of preparing a colorant particle dispersion enables preparation of a colorant particle dispersion in which the colorant particles are finely dispersed and which has excellent storage stability.

The organic solvent used in the method of preparing a colorant particle dispersion needs to be capable of dissolving or dispersing a dispersant in the invention, and also preferably has a certain degree of affinity for water. Specifically, the organic solvent preferably has a solubility of from 10% by mass to 50% by mass in water at 20° C.

More specifically, the colorant particle dispersion can be prepared by a preparation method that includes the following steps (1) and (2). However, the preparation of the colorant particle dispersion is not limited to the method.

Step (1): dispersing a mixture containing a pigment, a dispersant, an organic solvent capable of dissolving or dispersing the dispersant, a basic substance, and water.

Step (2): removing at least a part of the organic solvent from the mixture after being dispersed.

In step (1), a dispersant as described above is dissolved or dispersed in an organic solvent to form a mixture (a mixing process). Then, a solution containing water as a main component and further contains a pigment and a basic substance; water; and, optionally, a surfactant or the like, are added to the mixture. The resultant mixture is subjected to a mixing and dispersing treatment, thereby obtaining an oil-in-water colorant particle dispersion.

The amount of the basic substance to be added (neutralization degree) is not particularly limited. Usually, the acidobasicity of the finally-obtained colorant particle dispersion is preferably close to neutrality, for example, with a pH (25° C.) of from 4.5 to 10. Further, the pH can be determined by the neutralization degree for the dispersant.

The pigment, dispersant, and other additives used in the method of preparing a colorant particle dispersion have the same definitions as those described in the above section (explanation) for colorant particles, and preferable definitions thereof are also the same.

Preferable examples of organic solvents that may be used in the invention include alcohol solvents, ketone solvents, and ether solvents. Examples of alcohol solvents include ethanol, isopropanol, n-butanol, tertiary butanol, isobutanol, and diacetone alcohol. Examples of ketone solvents include acetone, methyl ethyl ketone, diethyl ketone, and methyl isobutyl ketone. Examples of ether solvents include dibutyl ether, tetrahydrofuran, and dioxane. Of these solvents, isopropanol, acetone, and methyl ethyl ketone are preferable, and methyl ethyl ketone is particularly preferable.

The organic solvent may be used singly, or two or more thereof may be used in combination.

In the preparation of a colorant particle dispersion, a kneading-dispersing treatment can be performed while applying a strong shear force, using, for example, a two-roll mill, a three-roll mill, a ball mill, a trommel, a disper, a kneader, a cokneader, a homogenizer, a blender or a uniaxial or biaxial extruder.

The specifics of the kneading and dispersing are described in T. C. Patton "Paint Flow and Pigment Dispersion" (John Wiley and Sons Inc., 1964) and the like.

A fine-dispersing treatment may be conducted, as necessary, using beads made of glass, zirconia or the like having a particle diameter of from 0.01 mm to 1 mm, with a vertical or horizontal sand grinder, a pin mill, a slit mill, a ultrasonic disperser or the like.

In the method for preparing a colorant particle dispersion, the method of removing the organic solvent is not particularly limited, and any known method such as distillation under reduced pressure may be used.

The colorant particles in the colorant particle dispersion obtained are capable of maintaining a state of favorably dispersed, and the colorant particle dispersion obtained exhibits an excellent temporal stability.

In the invention, the average particle diameter of the colorant particles is preferably from 10 nm to 200 nm, more preferably from 10 nm to 150 nm, and still more preferably from 10 nm to 100 nm. An average particle diameter of 200 nm or less realizes excellent color reproduction and, when used in an inkjet method, excellent ejection properties may be achieved. An average particle diameter of 10 nm or more realizes excellent light fastness.

The particle diameter distribution of the colorant particles is not particularly limited, and may be a broad particle diameter distribution or a monodispersed particle diameter distribution. In an embodiment, two or more types of colorant particles having different monodispersed particle diameter distributions may be used in mixture.

The average particle diameter and the particle diameter distribution of the colorant particles can be measured by, for example, a dynamic light scattering method.

The ink composition of the invention may include only one type of colorant particles, or two or more types of colorant particles in combination.

The content of colorant particles is preferably from 0.1% by mass to 25% by mass, more preferably from 1% by mass to 20% by mass, still more preferably from 1.5% by mass to 15% by mass, and particularly preferably from 1.5% by mass to 10% by mass, with respect to the mass of the ink composition, from the viewpoint of image density.

[Polymer Particles]

The ink composition preferably contains polymer particles in view of rubbing resistance.

Examples of the polymer particles that may be used include polymer particles described in, for example, paragraph numbers from [0021] to [0055] of JP-A No. 2010-046896.

In the invention, among the polymer particles described in paragraph numbers from [0021] to [0055] of JP-A No. 2010-046896, self-dispersing polymer particles are preferable, and self-dispersing polymer particles having a carboxyl group are more preferable, from the viewpoints of ejection stability and liquid stability. The term "self-dispersing polymer particles" refers to particles formed of a water-insoluble polymer that can reach a dispersed state in an aqueous medium by the action of functional groups of the polymer itself (particularly, an acid group or a salt thereof) in the absence of a surfactant, the water-insoluble polymer not including a separate emulsifying agent.

The main chain skeleton of the water-insoluble polymer is not particularly limited. Examples thereof include a vinyl polymer and a condensation polymer (such as an epoxy resin, a polyester, a polyurethane, a polyamide, cellulose, a polyether, a polyurea, a polyimide, and a polycarbonate). Among these, a vinyl polymer is particularly preferable.

Examples of the vinyl polymer and the monomer that constitutes the vinyl polymer include those described in JP-A No. 2001-181549 and JP-A No. 2002-88294. In addition, a vinyl polymer having a dissociative group introduced at a terminal end of a polymer chain by radical polymerization of vinyl monomers using a chain transfer agent, a polymerization initiator or an iniferter, or a vinyl polymer having a dissociative group (or a substituent group that can derive dissociative group) introduced at a terminal of a polymer chain by ion polymerization using a compound having a dissociative group (or a substituent groups that can derive dissociative group) as an initiator or a stopping agent, can also be used.

Preferable examples of the condensation polymer and the monomers that constitutes the condensation polymer include those described in JP-A No. 2001-247787.

The self-dispersing polymer particles preferably include a water-insoluble polymer having a hydrophilic structural unit and a structural unit derived from a monomer containing an aromatic group, from the viewpoints of self-dispersibility.

The hydrophilic structural unit is not particularly limited as long as the hydrophilic structural unit derives from a hydrophilic group-containing monomer. The hydrophilic structural unit may be derived from only one kind of hydrophilic-group-containing monomer or from two or more kinds of hydrophilic-group-containing monomers. The hydrophilic group is not particularly limited, and may be a dissociative group or a nonionic hydrophilic group.

The hydrophilic group is preferably a dissociative group, more preferably an anionic dissociative group, from the viewpoints of enhancing self-dispersibility and improving stability of the emulsified or dispersed state obtained. Examples of the anionic dissociative group include a carboxyl group, a phosphoric acid group, and a sulfonic acid group. A carboxyl group is particularly preferable from the viewpoint of the fixability of an ink composition.

The hydrophilic group-containing monomer is preferably a dissociative group-containing monomer, and more preferably a dissociative group-containing monomer having a dissociative group and an ethylenically unsaturated bond, from the viewpoint of self-dispersibility.

Examples of the dissociative group-containing monomer include an unsaturated carboxylic acid monomer, an unsaturated sulfonic acid monomer, and an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxyethylsuccinic acid.

Examples of the unsaturated sulfonic acid monomer include styrenesulfonic acid, 2-acrylamide-2-methylpropane sulfonic acid, 3-sulfopropyl(meth)acrylate, and bis-(3-sulfopropyl)itaconate.

Examples of the unsaturated phosphoric acid monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, unsaturated carboxylic acid monomers are preferable, and acrylic acid and methacrylic acid are more preferable, in consideration of dispersion stability and ejection stability.

The aromatic group-containing monomer is not particularly limited as long as it is a compound containing an aromatic group and a polymerizable group. The aromatic group may be a group derived from an aromatic hydrocarbon or a group derived from an aromatic heterocyclic ring. In the invention, from the viewpoints of the particle shape stability in an aqueous medium, a group derived from an aromatic hydrocarbon is preferable.

In addition, the polymerizable group may be a polymerizable group of condensation polymerizable or a polymerizable group of addition polymerizable. In the invention, an addition polymerizable-polymerizable group is preferable, and a group having an ethylenically unsaturated bond is more preferable, from the viewpoints of the particle shape stability in an aqueous medium.

The aromatic group-containing monomer is preferably a monomer having an aromatic group derived from an aromatic hydrocarbon and an ethylenically unsaturated bond. The aromatic group-containing monomer may be used alone or in a combination of two or more kinds.

The aromatic group-containing monomer is, from the viewpoints of balancing the hydrophobic property and hydrophilic property of the polymer chain and obtaining ink fixability, preferably an aromatic group-containing (meth)acrylate monomer, more preferably phenoxyethyl(meth)acrylate, benzyl(meth)acrylate, phenyl(meth)acryalate, isobornyl (meth)acryalate or adamantyl(meth)acrylate, and still more preferably phenoxyethyl(meth)acrylate, benzyl(meth)acrylate, and isobornyl(meth)acryalate.

In the invention, the term "(meth)acrylate" refers to acrylate or methacrylate.

From the viewpoints of self-dispersibility and the aggregation speed of the ink composition at the time of forming an image by contacting the ink composition with a treatment liquid, the self-dispersing polymer particles preferably contain a polymer having a carboxyl group, and the polymer preferably has a carboxyl group and has an acid value of from 25 mgKOH/g to 150 mgKOH/g. The acid value is more preferably from 50 mg KOH/g to 100 mg KOH/g. If the acid value is too low, the dispersion stability of the resin may lower and the stability of the ink may degrade. If the acid value is too high, the viscosity of the ink may increase, and adverse effects such as degradation in ejectability may occur.

The self-dispersing polymer particles are preferably particles of an acrylate-based polymer, and preferably contain a structural unit derived from an aromatic group-containing (meth)acrylate monomer, the content thereof being preferably from 10% by mass to 95% by mass with respect to the total mass of the self-dispersing polymer. The content of the aromatic group-containing (meth)acrylate monomer being in a range of from 10% by mass to 95% by mass may improve the stability of a self-emulsified or dispersed state and, furthermore, may suppress an increase in ink viscosity.

In the invention, from the viewpoints of stability of the self-dispersed state, stability of the particle shape in an aqueous medium due to hydrophobic interaction among the aromatic rings, and a decrease in the amount of water-soluble components due to an adequate degree of hydrophobization of the particles, the content of the aromatic group-containing (meth)acrylate monomer is more preferably from 15% by mass to 90% by mass, still more preferably from 15% by mass to 80% by mass, and particularly preferably from 25% by mass to 70% by mass.

In the invention, the self-dispersing polymer particles may include, for example, a structural unit derived from an aromatic group-containing monomer and a structural unit derived from a dissociative group-containing monomer. In addition, according to necessity, the self-dispersing polymer particles may further include additional structural unit(s).

The monomer that forms the additional structural unit is not particularly limited as long as it can be copolymerized with the aromatic group-containing monomer and the dissociative group-containing monomer. In particular, an alkyl group-containing monomer is preferred from the viewpoints of flexibility of the polymer skeleton and easy of controlling the glass transition temperature (Tg).

—Molecular Weight of Polymer Particles—

The range of the molecular weight of the polymer is, preferably from 1,000 to 200,000, more preferably from 1,000 to 100,000, and still more preferably from 1,000 to 10,000, in terms of weight average molecular weight. When the weight-average molecular weight is 1,000 or more, ejection stability may be ensured.

The weight-average molecular weight can be measured by gel permeation chromatography (GPC). In the invention, three columns of TSKgel Super HZM-H, TSKgel Super HZ4000, and TSKgel Super HZ2000 (trade names, manufactured by Tosoh Corporation), which are connected in series, and THF (tetrahydrofuran) as an eluting solution are used. The measurement conditions are as follows: sample concentration of 0.35% by mass, a flow rate of 0.35 mL/min, an amount of the sample injected of 10 μL, and a measurement temperature of 40° C. An RI detector is used for the measurement. Furthermore, the standard curves are obtained from eight samples of "standard sample TSK standard, polystyrene": "F-40", "F-20", "F-4", "F-1", "A-5000", "A-2500", "A-1000", and "n-propylbenzene" (manufactured by Tosoh Corporation).

Exemplary compounds are shown hereinbelow as specific examples of the self-dispersing polymer, although the invention is not limited thereto. The ratios shown in the parentheses indicate the mass ratio of copolymerized components.

Methyl methacrylate/isobonyl methacrylate/methacrylic acid copolymer (20/72/8), glass transition temperature: 180° C., acid value: 52.1

Methyl methacrylate/isobonyl methacrylate/methacrylic acid copolymer (40/52/8), glass transition temperature: 160° C., acid value: 52.1

Methyl methacrylate/isobonyl methacrylate/methacrylic acid copolymer (38/52/10), glass transition temperature: 160° C., acid value: 65.1

Methyl methacrylate/isobonyl methacrylate/methacrylic acid copolymer (42/52/6), glass transition temperature: 161° C., acid value: 39.1

Methyl methacrylate/isobonyl methacrylate/methacrylic acid copolymer (36.5/52/11.5), glass transition temperature: 160° C., acid value: 74.8

Methyl methacrylate/isobonyl methacrylate/methacrylic acid copolymer (36/52/12), glass transition temperature: 160° C., acid value: 78.1

Methyl methacrylate/isobonyl methacrylate/dicyclopentanyl methacrylate/methacrylic acid copolymer (20/62/10/8), glass transition temperature: 170° C., acid value: 52.1

Methyl methacrylate/dicyclopentanyl methacrylate/methacrylic acid copolymer (20/72/8), glass transition temperature: 160° C., acid value: 52.1

Methyl methacrylate/dicyclopentanyl methacrylate/methacrylic acid copolymer (18/72/10), glass transition temperature: 161° C., acid value: 65.1

The polymer particles (in particular, self-dispersing polymer particles) may be used alone or in a mixture of two or more kinds.

From the viewpoints of rubbing resistance and uniform glossiness of a printed image, the content of the polymer particles (in particular, self-dispersing polymer particles) in the ink composition is preferably from 1% by mass to 10% by mass, and more preferably from 2% by mass to 5% by mass, with respect to the total mass of the ink composition.

[Water]

In the invention, the ink composition contains water. The amount of water contained in the ink composition is not particularly limited. In the invention, the content of water is preferably from 10% by mass to 99% by mass, and more preferably from 30% by mass to 80% by mass.

[Water-Soluble Organic Solvent]

The ink composition of the invention may further contain a water-soluble organic solvent. By including a water-soluble organic solvent, drying of the ink composition may be suppressed and permeation may be promoted.

In particular, when the ink composition of the invention is used in an inkjet image recording method, clogging of ink ejection ports due do drying of the ink composition may be effectively suppressed.

The water-soluble organic solvent is preferably one having a vapor pressure which is lower than that of water. Specific examples of such water-soluble organic solvents include polyhydric alcohols represented by, for example, ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohols such as ethylene glycol monomethyl(or ethyl)ether, diethylene glycol monomethyl (or ethyl)ether, and triethylene glycol monoethyl(or butyl)ether; heterocycles such as 2-pyrrolidone, N-methyl-2-pyrrolidone, 1,3-dimethyl-2-imidazolidinone and N-ethyl morpholine; sulfur-containing compounds such as sulfolane, dimethyl sulfoxide and 3-sulfolene; polyfunctional compounds such as diacetone alcohol and diethanolamine; and urea derivatives. In particular, a polyhydric alcohol such as glycerin or diethylene glycol is preferable as an anti-drying agent. These water-soluble organic solvents may be used singly or two or more kinds thereof may be used in combination. The water-soluble organic solvent is preferably contained in the ink composition in an amount of 10% by mass to 50% by mass.

Further, by using a water-soluble organic solvent, penetration of the ink composition into a recording medium (print paper) can be promoted. Specific examples include alcohols such as ethanol, isopropanol, butanol, di(tri)ethylene glycol monobutyl ether and 1,2-hexanediol, sodium lauryl sulfate, sodium oleate, and nonionic surfactants. The water-soluble organic solvent is preferably contained in an amount of from 5% by mass to 30% by mass in the ink composition. The permeation promoter is preferably used in an amount to such an extent that the permeation promoter does not cause bleeding or print-through of a printed image.

In addition to the above purposes, the water-soluble organic solvent may be used for adjusting the viscosity. Specific examples of the water-soluble organic solvent which may be used for adjusting the viscosity include alcohols (for example, methanol, ethanol, propanol, isopropanol, butanol, isobutanol, sec-butanol, t-butanol, pentanol, hexanol, cyclohexanol, and benzyl alcohol); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol); glycol derivatives (for example, ethyleneglycol monomethylether, ethyleneglycol monoethylether, ethyleneglycol monobutylether, diethyleneglycol monomethylether, diethyleneglycol monobutylether, propyleneglycol monomethylether, propyleneglycol monobutylether, dipropyleneglycol monomethylether, triethyleneglycol monomethylether, ethyleneglycol diacetate, ethyleneglycol monomethylether acetate, triethyleneglycol monomethylether, triethyleneglycol monoethylether and ethyleneglycol monophenylether); amines (for example, ethanolamine, diethanolamine, triethanolamine, N-methyl diethanolamine, N-ethyl diethanolamine, morpholine, N-ethyl morpholine, ethylenediamine, diethylene triamine, triethylenetetramine, polyethyleneimine, and tetramethyl propylenediamine); and other polar solvents (for example, formamide, N,N-dimethyl formamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The water-soluble organic solvent may be used alone, or two or more kinds the water-soluble organic solvents may be used in combination.

(Additional Components)

Examples of the additional components that can be contained in the ink composition include known additives such as an anti-fading agent, an emulsion stabilizer, a penetration enhancer, an ultraviolet absorbent, a preservative agent, an antifungal agent, a pH adjuster, a defoamer, a viscosity modifier, a dispersant, a dispersion stabilizer, an antirust agent, a chelating agent, a surfactant, and a solid moisturizing agent. These additives may be directly added to the ink composition after preparation thereof, or may be added during preparation of the ink composition. Specific examples of the additives include those described in paragraph numbers from [0153] to [0162] of JP-A No. 2007-100071.

<Ink Set>

The ink set of the invention includes at least one ink composition having a color selected from cyan, magenta, yellow, and black.

The respective ink compositions of the four colors may be produced by selecting a colorant of a desired color from those described in the above section of the ink composition.

The ink set of the invention may be used in an image forming method using the ink composition described below, and is especially suitable for use as an ink set in an inkjet image forming method.

The ink set of the invention preferably further contains a treatment liquid which is capable of causing aggregation upon contact with the inkjet ink composition in view of improvements in blocking resistance immediately after the image formation and rubbing resistance.

[Treatment Liquid]

The treatment liquid which can be used in the invention is capable of causing aggregation upon contact with the inkjet ink composition described above. Specifically, the treatment liquid preferably contains at least an aggregating component capable of forming an aggregate by aggregating dispersed particles, such as colorant particles (pigment or the like) contained in the ink composition. The treatment liquid may further include other components, as necessary. Use of the treatment liquid in combination with the ink composition may enable inkjet recording at high speed, and an image having high density, excellent print properties with high resolution (such as an ability of reproducting thin lines or fine portions), blocking resistance immediately after the image formation, and rubbing resistance, may be formed even at high recording speeds.

(Aggregating Component)

The treatment liquid may include at least one aggregating component capable of forming an aggregate upon contact with the ink composition. When the treatment liquid is mixed with the ink composition that has been deposited by an inkjet method, aggregation of pigment or the like, which has been stably dispersed in the ink composition, is promoted.

The treatment liquid is, for example, a liquid that is capable of forming an aggregate by changing the pH of the ink composition. The pH (at 25° C.±1° C.) of the treatment liquid is preferably from 1 to 6, more preferably from 1.0 to 5, and still more preferably from 1.0 to 4, from the viewpoint of aggregation rate of the ink composition. In this case, the pH (at 25° C.±1° C.) of the ink composition to be ejected is preferably from 7.5 to 9.5, and more preferably from 8.0 to 9.0.

In the invention, it is preferable that the pH (at 25° C.±1° C.) of the ink composition is 7.5 or higher and that the pH of the treatment liquid (at 25° C.±1° C.) is from 1.0 to 3, from the viewpoints of image density, resolution, and inkjet recording speed.

The aggregating component may be used singly, or two or more thereof may be used in mixture.

The treatment liquid may include at least one acidic compound as an aggregating component. Examples of the acidic compound include compounds having a phosphoric acid group, a phosphonic acid group, a phosphinic acid group, a sulfuric acid group, a sulfonic acid group, a sulfinic acid group, or a carboxyl group, and salts thereof (such as polyvalent metal salts thereof). From the viewpoint of coagulation speed of the ink composition, compounds having a phosphoric acid group or a carboxyl group are preferable, and compounds having a carboxyl group are more preferable.

The compounds having a carboxyl group are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, derivatives of these compounds, and salts thereof (such as polyvalent metal salts). These compounds may be used singly, or in combination of two or more thereof.

The treatment liquid may include, as an aggregating component, a polyvalent metal salt or a polyallylamine. Use of this treatment liquid improves high-speed aggregation properties. Examples of the polyvalent metal salt include: a salt of an alkaline earth metal, which belongs to Group 2 of the Periodic Table, such as magnesium or calcium; a salt of a transition metal belonging to Group 3 of the Periodic Table, such as lanthanum; a salt of a metal belonging to Group 13 of the Periodic Table, such as aluminum; and a salt of a lanthanide, such as neodymium. A polyallylamine and a polyallylamine derivative can also be used. The salt of such a metal is preferably a carboxylic acid salt (such as a formate, acetate, or benzoate), a nitrate, a chloride, or a thiocyanate. In particular, the following salts are preferable: a calcium or magnesium salt of a carboxylic acid (such as formic acid, acetic acid, or benzoic acid); a calcium or magnesium salt of nitric acid; calcium chloride; magnesium chloride; and a calcium or magnesium salt of thiocyanic acid.

The content of polyvalent metal salt in the treatment liquid is preferably from 1% by mass to 10% by mass, more preferably from 1.5% by mass to 7% by mass, and still more preferably from 2% by mass to 6% by mass, form the viewpoint of aggregation effects.

The treatment liquid may include at least one cationic organic compound as an aggregation agent. Examples of the cationic organic compound include cationic polymers such as a poly(vinylpyridine) salt, poly(alkylaminoethyl acrylate), poly(alkylaminoethyl methacrylate), poly(vinylimidazol), polyethyleneimine, polybiguanide, polyguanide, polyallylamine, and derivatives thereof.

The weight average molecular weight of the cationic polymer is preferably smaller from the viewpoint of the viscosity of the treatment liquid. When the treatment liquid is applied to a recording medium by an inkjet method, the weight average molecular weight of the cationic polymer is preferably in the range of from 1,000 to 500,000, more preferably from 1,500 to 200,000, and still more preferably from 2,000 to 100,000. A weight average molecular weight of 1,000 or more is preferable in terms of aggregation speed, and a weight average molecular weight of 500,000 or less is preferable in terms of ejection reliability. The above preferable ranges do not necessarily apply when the treatment liquid is applied to a recording medium by a method other than inkjetting.

The cationic organic compound is preferably, for example, a primary, secondary, or tertiary amine salt compound. Examples of the amine salt compound include a cationic amine salt-type compound and an amphoteric surfactant that exhibits cationic properties at a desired pH range. Examples of the cationic amine salt compound include: hydrochloride or acetate of an amine, such as hydrochloride or acetate of laurylamine, cocoamine, stearylamine, or rosin amine; a quaternary ammonium salt compound such as lauryl trimethyl ammonium chloride, cetyl trimethyl ammonium chloride, lauryl dimethyl benzyl ammonium chloride, benzyl tributyl ammonium chloride, or benzalkonium chloride; a pyridinium salt compound such as cetylpyridinium chloride or cetylpyridinium bromide; an imidazoline-based cationic compound such as 2-heptadecenyl-hydroxyethyl imidazoline; and an ethyleneoxide adduct of a higher alkylamine such as dihydroxyethyl stearylamine. Examples of the amphoteric surfactant that exhibits cationic properties at a desired pH range include: amino acid-type amphoteric surfactant, a compound having a structure of R—NH—CH$_2$CH$_2$—COOH(R representing an alkyl group etc.), a carboxylate-type amphoteric surfactant such as stearyl dimethyl betaine or lauryl dihydroxyethyl betaine, a sulfuric ester amphoteric surfactant, a sulfonic acid amphoteric surfactant, and a phosphoric ester amphoteric surfactant.

Among them, di- or higher-valent cationic organic compounds are preferred.

The content of the cationic organic compound in the treatment liquid is preferably from 1% by mass to 50% by mass, and more preferably from 2% by mass to 30% by mass, from the viewpoint of aggregation effects.

Among them, di- or higher-valent carboxylic acids or di- or higher-valent cationic organic compounds are preferable as an aggregating component, from the viewpoints of aggregation properties and rubbing resistance of an image.

The viscosity of the treatment liquid is preferably in the range of from 1 mPa·s to 30 mPa·s, more preferably from 1 mPa·s to 20 mPa·s, and still more preferably from 2 mPa·s to 15 mPa·s, and particularly preferably from 2 mPa·s to 10 mPa·s, from the viewpoint of the aggregation speed of the ink composition. Here, the viscosity is measured using a VISCOMETER TV-22 (trade name, manufactured by Toki Sangyo Co., Ltd.) at 20° C.

The surface tension of the treatment liquid is preferably from 20 mN/m to 60 mN/m, more preferably from 20 mN/m to 45 mN/m, and still more preferably from 25 mN/m to 40 mN/m, from the viewpoint of the aggregation speed of the ink composition. Here, the surface tension is measured using an automatic surface tensiometer CBVP-Z (trade name, manufactured by Kyowa Interface Science Co., Ltd.) at 25° C.

(Other Components)

In general, the treatment liquid of the invention may include a water-soluble organic solvent, in addition to the aggregating component. The treatment liquid may further include other additives, as long as the effect of the invention is not impaired. The specifics of the water-soluble organic solvent are the same as the specifics of the above-described hydrophilic organic solvent in the ink composition.

Examples of the other additives include a known additive such as an anti-drying agent (humectant), an anti-fading agent, an emulsion stabilizer, a penetration enhancing agent, a UV absorber, an antiseptic agent, an antimildew agent, a pH adjuster, a surface tension controller, an anti-foam agent, a viscosity adjuster, a dispersant, a dispersion stabilizer, an antirust agent, or a chelating agent. The additives that may be contained in the ink composition, as described above, may be used in the treatment liquid.

<Image Forming Method>

The image forming method of the invention includes: an ink application process of applying the inkjet ink composition onto a recording medium to form an image; and a treatment liquid application process of applying a treatment liquid, which is capable of causing formation of an aggregate when contacting with the inkjet ink composition of the invention, onto a recording medium. The image forming method may further include one or more other processes, as necessary.

In the following, the respective steps of the image forming method of the invention are described.

—Ink Application Process—

In the ink application process, the inkjet ink composition of the invention described above is applied onto a recording medium by an inkjet method. In this process, the ink composition can be applied selectively onto a recording medium, whereby a desired visual image can be formed. The specifics of each component of the ink composition and preferable embodiments are as described above.

Specifically, formation of an image by inkjetting may be performed by ejecting a treatment liquid by applying energy onto a desired recording medium. The recording medium is, for example, plain paper or resin-coated paper, such as those for paper exclusively for inkjet recording, a film, paper that can be used both for inkjet recording and electrophotographic recording, cloth, glass, metal or ceramic, and examples thereof include those described in JP-A Nos. 8-169172, 8-27693, 2-276670, 7-276789, 9-323475, 62-238783, 10-153989, 10-217473, 10-235995, 10-337947, 10-217597, and 10-337947. The method described in paragraphs [0093] to [0105] of JP-A No. 2003-306623 may be suitably applied to the invention.

The inkjet method is not particularly limited, and may be any known method such as a charge-control method in which ink is ejected by electrostatic attraction force; a drop-on-demand method (pressure-pulse method) in which a pressure of oscillation of a piezo element is utilized; an acoustic inkjet method in which ink is ejected by radiation pressure generated by irradiation of ink with acoustic beams that have been converted from electric signals; and a thermal inkjet method in which ink is ejected by a pressure generated by formation of bubbles caused by heating of ink (BUBBLEJET, registered trademark).

Further, examples of the inkjet method include a method in which a large number of small-volume droplets of ink having a low color density, which is called a photo ink, are ejected; a method in which inks having substantially the same hue but different densities are used to improve image quality; and a method in which a clear and colorless ink is used.

The inkjet head used in an inkjet method may be either an on-demand type head or a continuous type head. Examples of ejection systems include electromechanical transduction systems (such as a single-cavity system, a double-cavity system, a vendor system, a piston system, a share-mode system and a shared-wall system), electrothermal transduction systems (such as a thermal inkjet system and a BUBBLE-JET (registered trademark) system), electrostatic suction systems (such as an electric-field-control system and a slit-jet system), and discharge systems (such as a spark jet system), and any of these ejection systems is applicable.

The ink nozzles or other means used for inkjet recording are not particularly limited, and may be selected as appropriate according to purposes.

Regarding the inkjet head, there are a shuttle system in which recording is performed while a short serial head having a small length is moved in a width direction of a recording medium in a scanning manner, and a line system in which a line head having recording devices that are aligned to correspond to the entire length of a side of a recording medium is used. In the line system, image recording can be performed over the entire area of a surface of a recording medium by moving the recording medium in a direction orthogonal to the direction along which the recording devices are aligned, and a conveyance system, such as carriage, which moves the short head to scan is unnecessary. Since the complicated of the movement of the carriage and the recording medium need not to be controlled while moving only the recording medium, the recording speed achieved by the line system is higher than that of the shuttle system. Either system can be applied to the image forming method of the invention, but the effect of improving blocking resistance or rubbing resistance is generally more significant in a line system, in which dummy jetting is not performed.

In an ink application step of the invention according to a line system, recording can be performed using not only one ink composition but also two or more ink compositions, suitably by setting the interval between the ejection of the first ink (the n-th color (n>1), for example the second color) and the ejection of the subsequent ink (the (n+1)-th color, for example the third color) to be 1 second or less. In the invention, by setting the ejection interval to be 1 second or less, an image with excellent rubbing resistance and suppressed occurrence of blocking can be obtained at a speed higher than ever, while preventing bleeding and intermingling of colors that may occur by interference of ink droplets. The image obtained may also have favorable hue and printing properties (such as reproducibility of thin lines or fine portions in the image).

The amount per droplet of the ink composition ejected from the inkjet head is preferably from 0.5 pl to 6 pl (picoliter), more preferably from 1 pl to 5 pl, and still more preferably from 2 pl to 4 pl, from the viewpoint of obtaining a high resolution image.

—Treatment Liquid Application Process—

In the treatment liquid application process, the treatment liquid capable of causing formation of an aggregate when contacting with the ink composition is applied to a recording medium, and the treatment liquid is allowed to contact with the ink composition. When the treatment liquid contacts the ink composition, dispersed particles in the composition, such as polymer particles or colorant particles (for example, a pigment) are made to aggregate and fixed to the recording medium. The specifics and preferable embodiments of the components of the treatment liquid are as described above.

The application of the treatment liquid can be performed by a known method such as a coating method, an inkjet method, or a dip method. The coating method may be carried out using a known coater such as a bar coater, an extrusion die coater, an air doctor coater, a blade coater, a rod coater, a knife coater, a squeeze coater, a reverse roll coater, or the like. The specifics of the inkjet method are as described above.

The treatment liquid application process may be conducted either before or after the ink application process.

In the invention, it is preferable to conduct the ink application after the application of the treatment liquid. Specifically, the treatment liquid for aggregating a colorant (preferably a pigment) in the ink composition is preferably applied onto the recording medium in advance of the application of the ink composition, such that an image is formed by applying the ink composition so as to contact the treatment liquid that has been applied onto the recording medium. In this way, inkjet recording carried out at high speed, and an image having high density and high resolution can be obtained even when high-speed recording is performed.

The amount of the treatment liquid to be applied is not particularly limited as long as the treatment liquid can aggregate the ink composition. The amount of the treatment liquid to be applied is preferably determined so that the amount of aggregating component (such as a di- or higher-valent carboxylic acid or a cationic organic compound) to be applied is 0.1 g/m$^2$ or higher. The amount of the treatment liquid is more preferably such that the amount of the aggregating component applied is from 0.1 to 1.0 g/m$^2$, still more preferably from 0.2 to 0.8 g/m$^2$. When the application amount of the aggregating component is 0.1 g/m$^2$ or more, the aggregation reaction proceeds in a favorable manner. When the application amount of the aggregating component is 1.0 g/m$^2$ or less, the degree of gloss is not to be too high, which is preferable.

In the invention, it is preferable to provide a heat-drying process in which the treatment liquid is dried by heating, after the application of the treatment liquid onto the recording medium and before the application of the ink composition. By drying the treatment liquid by heating prior to applying the ink composition, favorable ink application properties such as bleed prevention may be achieved and a visible image having excellent color density and excellent hue may be formed.

The drying by heating may be conducted by using a known heating device such as a heater, a blowing device such as a dryer, or a combination thereof. The heating may be performed according to, for example, a method of applying heat, by using a heater or the like, from a side of the recording medium opposite to the surface onto which the treatment liquid is applied; a method of blowing a warm or hot air to a surface of the recording medium onto which the treatment liquid is applied; or a method of heating with an infrared heater. It is also possible to combine two or more of these methods.

[Thermal Fixing Process]

The image forming method of the invention preferably includes, after the step of applying ink, a thermal fixing process in which an image formed from the ink is thermally fixed by contacting a heated surface to the image. By performing this step, rubbing resistance of the image is further improved.

The thermal fixing is preferably conducted at a temperature that is equal to or higher than the minimum film-formation temperature (MFT) of the polymer particles in the image. By heating the image to a temperature of not less than the MFT, a film of polymer particles is formed to strengthen the image. The heating temperature is preferably selected from a temperature range of not less than the MFT. Specifically, the heating temperature is preferably in the range of from 40° C. to 80° C., more preferably from 50° C. to 75° C., and still more preferably from 55° C. to 70° C.

The minimum film-formation temperature (MFT) of the polymer particles is regulated by the glass transition temperature (Tg) of the polymer, and the type and the amount of the ink solvent. Typically, the MFT tends to decrease as the Tg decreases, the I/O value of the ink solvent decreases, or the amount of the ink solvent increases.

If a pressure is applied together with heat, the pressure is preferably in the range of from 0.1 MPa to 3.0 MPa, more preferably from 0.1 MPa to 1.0 MPa, and still more preferably from 0.1 MPa to 0.5 MPa, from the viewpoint of obtaining a smooth surface.

The method of heating is not particularly limited, and preferable examples thereof include a non-contact drying method, such as a method of heating with a heat generator such as a nichrome wire heater, a method of supplying a warm or hot air, or a method of heating with a halogen lamp, an infrared lamp, or the like. The method of applying heat and pressure is not particularly limited, and preferable examples thereof include a contact thermal fixing method, such as a method of pressing a hot plate against an image-formed surface of the recording medium, a method in which a heat-pressurization apparatus is used to pass the recording medium through a pressure contact portion, the heat-pressurization apparatus having a pair of heat-pressurization rollers or a pair of heat-pressurization belts, or a heat-pressurization belt disposed at the image-recorded surface of the recording medium and a support roller disposed at the opposite side of the recording medium. The pressure contact portion is thus formed between the pair of rollers or between the pair of heat-pressurization belts or between the heat-pressurization belt and the support roller.

When applying heat and pressure, the nip time is preferably from 1 msec to 10 sec, more preferably from 2 msec to 1 sec, and still more preferably from 4 msec to 100 msec. The nip width is preferably from 0.1 mm to 100 mm, more preferably from 0.5 mm to 50 mm, and still more preferably from 1 mm to 10 mm.

The heat-pressurization roller may be a roller made of metal, or a roller having a metal core covered with a coating layer made of an elastic material and an optional surface layer (also referred to as a release layer).

The belt substrate that forms a heat-pressurization belt used in a heat-pressurization apparatus is preferably a seamless nickel electric brass, and the thickness of the substrate is preferably from 10 μm to 100 μm. In addition to nickel, the belt substrate may be made of aluminum, iron, polyethylene, and the like. When a silicone resin or a fluororesin is applied on the substrate, the thickness of the resin layer is preferably from 1 μm to 50 μm, and more preferably from 10 μm to 30 μm.

In order to obtain a pressure (nip pressure) within the above range, elastic members that exhibit tension, such as a spring, may be selected and disposed at both ends of the roller (for example, a heat-pressurization roller) such that a desired nip pressure is obtained in consideration of the nip gap.

The conveyance speed of the recording medium when using a heat-pressurization roller or a heat-pressurization belt is preferably from 200 mm/sec to 700 mm/sec, more preferably from 300 mm/sec to 650 mm/sec, and still more preferably from 400 mm/sec to 600 mm/sec.

—Recording Medium—

According to the image forming method of the invention, an image is recorded on a recording medium.

The recording medium is not particularly limited, and may be a cellulose-based general printing paper used for general offset printing and the like, such as high-quality paper, coated paper, or art paper. When image recording is performed on the cellulose-based general printing paper by an ordinary inkjet method using an aqueous ink, absorption and drying of the ink is relatively slow, colorant migration tends to occur after the deposition of ink, or image quality tends to degrade. In contrast, according to the image forming method of the invention, recording of a high-quality image having excellent color density and excellent hue is achieved while suppressing the migration of the colorant.

The recording medium may be a commercially-available product, and examples thereof include high-quality papers (A) such as OK PRINCE JO-SHITSU manufactured by Oji Paper Co., Ltd., SHIRAOI manufactured by Nippon Paper Industries Co., Ltd., and New NPI JO-SHITSU manufactured by Nippon Paper Industries Co., Ltd.; very light-weight coated papers such as OK EVER LIGHT COAT manufactured by Oji Paper Co., Ltd. and AURORA S manufactured by Nippon Paper Industries Co., Ltd.; lightweight coat papers (A3) such as OK COAT L manufactured by Oji Paper Co., Ltd. and AURORA L manufactured by Nippon Paper Industries Co., Ltd.; coated papers (A2, B2) such as OK TOPCOAT PLUS manufactured by Oji Paper Co., Ltd. and AURORA COAT manufactured by Nippon Paper Industries Co., Ltd.; and art papers (A1) such as OK KANAFUJI PLUS manufactured by Oji Paper Co., Ltd. and TOKUBISHI ART manufactured by Mitsubishi Paper Mills Ltd. Various kinds of inkjet-recording paper used for photograph may also be used as the recording medium.

Among them, a recording medium having a water absorption coefficient Ka of from 0.05 mL/m$^2$·ms$^{1/2}$ to 0.5 mL/m$^2$·ms$^{1/2}$ is preferable, a recording medium having a water absorption coefficient Ka of from 0.1 mL/m$^2$·ms$^{1/2}$ to 0.4 mL/m$^2$·ms$^{1/2}$ is more preferable, and a recording medium having a water absorption coefficient Ka of from 0.2 mL/m$^2$·ms$^{1/2}$ to 0.3 mL/m$^2$·ms$^{1/2}$ is still more preferable, from the viewpoints of suppressing the colorant migration more effectively and obtaining a high-quality image having more favorable color density and hue than before.

The water absorption coefficient Ka has the definition described in JAPAN TAPPI Pulp and Paper Testing Method No. 51: 2000 (published by JAPAN TAPPI). Specifically, the water absorption coefficient Ka is calculated from a difference in water transfer amount at a contact time of 100 ms and at a contact time of 900 ms, which can be measured using an automatic scanning liquid absorptometer KM500WIN (trade name, manufactured by Kumagai Riki Kogyo Co., Ltd.)

Among these recording media, coated paper, which is used for general offset printing, is preferable. The coated paper is produced generally by coating a surface of cellulose-based paper (such as high-quality paper or neutral paper) that has not been subjected to surface treatment, with a coating material so as to form a coating layer. When image forming is performed by inkjetting with an aqueous ink, the coated paper tends to cause problems in quality, for example, in image gloss or rubbing resistance. However, according to the image forming method of the invention, unevenness in gloss may be suppressed and an image having excellent gloss and excellent rubbing resistance may be obtained even when the coated paper is used. In particular, it is preferable to use a coated paper including a base paper on which a coated layer including kaolin and/or calcium bicarbonate is formed. Specifically, art paper, coated paper, lightweight coated paper, or very light-weight coated paper are more preferable.

The recorded material of the invention obtained by the image forming method of the invention may have high resolution, high rubbing resistance, and excellent blocking resistance even when the image recording is performed at high speed.

The following are exemplary embodiments of the present invention. However, the invention is not limited to these examples.

<1> An ink composition comprising a colorant, water and wax particles, the wax particles comprising at least two kinds of wax.

<2> The ink composition according to <1>, wherein the at least two kinds of wax comprise a first wax and a second wax, the first and second waxes having different specific gravities from each other.

<3> The ink composition according to <1> or <2>, wherein the first has a specific gravity of 0.95 or less and the second wax has a specific gravity of not less than 0.95.

<4> The ink composition according to any one of <1> to <3>, wherein the difference of the specific gravity of the first wax and the specific gravity of the second wax is from 0.05 to 0.15.

<5> The ink composition according to any one of <1> to <4>, wherein the mass ratio of the first wax to the second wax is from 1:4 to 4:1.

<6> The ink composition according to any one of <1> to <5>, further comprising polymer particles.

<7> The ink composition according to any one of <1> to <6>, wherein the colorant is a pigment.

<8> An ink set comprising the ink composition according to any one of <1> to <7>, the ink composition having a color selected from the group consisting of cyan, magenta, yellow and black.

<9> The ink set according to <8>, further comprising a treatment liquid comprising an aggregation component that aggregates the ink composition upon contact with the ink composition.

<10> An image forming method comprising:
applying the ink composition according to <1> onto a recording medium; and applying a treatment liquid onto the recording medium, the treatment liquid comprising an aggregation component that aggregates the ink composition upon contact with the ink composition.

<11> The image forming method according to <10>, further comprising thermally fixing an image formed by applying the ink composition and the treatment liquid.

EXAMPLES

In the following, the invention will be described in detail with reference to the examples, but the invention is not limited thereto. Unless otherwise specified, "part" and "percent (%)" are based on mass.

The weight average molecular weight was measured by gel permeation chromatography (GPC). The GPC was performed by using HLC-8220GPC (manufactured by Tosoh Corporation), three columns TSKGEL SUPER HZM-H, TSKGEL SUPER HZ4000, and TSK GEL SUPERHZ 2000 (all trade names, manufactured by Tosoh Corporation) connected in series, and tetrahydrofuran (THF) as an eluate. Further, the measurement was performed with a refractive index detector under the conditions at a sample concentration of 0.35% by mass, a flow rate of 0.35 mL/min, a sample ejection amount of 10 μL, and a measurement temperature of 40° C. A calibration curve was obtained from eight samples of "F-40", "F-20", "F-4", "F-1", "A-5000", "A-2500", "A-1000", and "N-PRO-PYLBENZENE" of standard sample TSK standard, polystyrene, manufactured by Tosoh Corporation.

Example 1

Preparation of Ink set 1

A polymer dispersant P-1 was synthesized as shown below.

—Synthesis of Polymer Dispersant P-1—

88 g of methyl ethyl ketone was placed in a 1000-mL three-necked flask equipped with a stirrer and a cooling tube, and heated to 72° C. in a nitrogen atmosphere. A solution in which 0.85 g of dimethyl 2,2'-azobisisobutyrate, 60 g of benzyl methacrylate, 10 g of methacrylic acid, and 30 g of methyl methacrylate were dissolved in 50 g of methyl ethyl ketone was added dropwise over 3 hr. After completing the dropwise addition and further allowing the mixture to react for 1 hr, a solution in which 0.42 g of dimethyl 2,2'-azobisisobutyrate was dissolved in 2 g of methyl ethyl ketone was added, and the temperature of the mixture was elevated to 78° C. and heated for 4 hr. The obtained reaction solution was re-precipitated twice in a great excess of hexane, and a precipitated resin was dried, thereby obtaining 96 g of a polymer dispersant P-1.

The composition of the obtained polymer dispersant P-1 was confirmed by $^1$H-NMR and the weight average molecular weight (Mw) determined by GPC was 44,600. Further, the acid value was determined according to a method described in JIS standards (JIS K0070:1992), and the result was 65.2 mgKOH/g.

P-1

(Preparation of Pigment Dispersion C)

10 parts of Pigment Blue 15:3 (PHTHALOCYANINE BLUE A220, trade name, manufactured by Dainichiseika Color & Chemicals Mfg. Co., Ltd.), 5 parts of the polymer dispersant P-1, 42 parts of methyl ethyl ketone, 5.5 parts of an aqueous 1N NaOH solution, and 87.2 parts of ion exchange water were mixed, and the mixture was dispersed for 2 to 6 hours with a bead mill using zirconia beads having a diameter of 0.1 mm.

From the obtained dispersion, methyl ethyl ketone was removed at 55° C. under reduced pressure, and part of water was removed. Then, the resultant was subjected to centrifugal treatment using a 50-mL centrifuging tube and a high-speed centrifugal cooler (7550, manufactured by Kubota Corporation) at 8000 rpm for 30 minutes, thereby collecting a supernatant other than a precipitate. Thereafter, the pigment concentration was determined from the absorbance spectrum, thereby obtaining a dispersion C (cyan dispersion C) in which resin-coated pigment particles (pigment coated with a polymer dispersant) are dispersed at a pigment concentration of 10% by mass.

(Preparation of Pigment Dispersion M)

A pigment dispersion M, in which resin-coated pigment particles coated with a polymer dispersant were dispersed at a pigment concentration of 10% by mass, was prepared in the same manner as the preparation of the pigment dispersion C, except that Pigment Red 122 (CROMOPHTAL JET MAGENTA DMQ, trade name, manufactured by Ciba Specialty Chemicals; magenta pigment) was used in place of Pigment Blue 15:3 (PHTHALOCYANINE BLUE A220, trade name, manufactured by Dainichiseika Color & Chemicals Mfg. Co., Ltd.).

(Preparation of Pigment dispersion Y)

A pigment dispersion Y, in which resin-coated pigment particles coated with a polymer dispersant were dispersed at a pigment concentration of 10% by mass, was prepared in the same manner as the preparation of the pigment dispersion C, except that Pigment Yellow 74 (FAST YELLOW FG, trade name, manufactured by Sanyo Color Works, Ltd.; yellow pigment) was used in an amount of 4.0 g in terms of solid content, in place of Pigment Blue 15:3. The average particle diameter of the yellow dispersion liquid Y was 82 nm.

(Preparation of Pigment Dispersion K)

A pigment dispersion K, in which resin-coated pigment particles coated with a polymer dispersant were dispersed, was prepared in the same manner as the preparation of the pigment dispersion C, except that carbon black (NIPEX160-IQ, trade name, manufactured by Degussa; black pigment) was used in an amount of 3.0 g in terms of solid content, in place of Pigment Blue 15:3. The average particle diameter of the black dispersion liquid K was 130 nm.

—Preparation of Polymer Particles B-01—

560.0 g of methyl ethyl ketone were placed in a 2 L three-necked flask equipped with an agitator, a thermometer, a reflux condenser, and a nitrogen gas introduction tube, and the temperature was elevated to 87° C. Thereafter, a mixed solution of 278.4 g of methyl methacrylate, 243.6 g of isobornyl methacrylate, 58.0 g of methacrylic acid, 108 g of methyl ethyl ketone, and 2.32 g of V-601 (trade name, manufactured by Wako Pure Chemical Industries Co., Ltd.) was dropped at a constant rate while maintaining the inside of the reaction container (flask) to be refluxed (the reflux was continued until the reaction was completed), such that the dropping was completed in 2 hours. After the completion of the dropping, the content of the flask was agitated for one hour.

Thereafter, a solution in which 1.16 g of V-601 were dissolved in 6.4 g of methyl ethyl ketone was added to the flask and agitated for 2 hours. The same process was carried out four times. Subsequently, a solution in which 1.16 g of V-601 were dissolved in 6.4 g of methyl ethyl ketone was further added thereto, and the content of the flask was agitated for 3 hours.

After the completion of polymerization reaction, the temperature of the solution was decreased to 65° C., and 163.0 g of isopropanol were added thereto. The resultant solution was allowed to cool down. The weight average molecular weight (Mw) of the obtained copolymer was 63,000, and the acid value of the obtained copolymer was 65.1 mgKOH/g.

Subsequently, 317.3 g of the obtained copolymer solution (solid content concentration: 41.0%) were weighed, and 46.4 g of isopropanol, 1.65 g of a 20% maleic anhydride solution (water-soluble acidic compound, equivalent of 0.3% as maleic acid with respect to the copolymer) and 40.77 g of a 2 mol/L NaOH aqueous solution were added thereto, and the temperature inside the reaction container was raised to 70° C. Then, 380 g of distilled water was dropped at a rate of 10 ml/min, thereby allowing the resultant mixture to form an aqueous dispersion (a dispersing process).

Subsequently, the aqueous dispersion was allowed to stand for 1.5 hours under reduced pressure at a reaction container internal temperature of 70° C., thereby distilling off isopropanol, methyl ethyl ketone and water in a total amount of 287.0 g (a solvent removal process). 0.278 g of PROXEL GXL(S) (trade name, manufactured by Arch Chemicals Japan Inc.), which amount corresponds to a benzoisothiazoline-3-one amount of 440 ppm with respect to the polymer solid content, were added to the dispersion. The dispersion was then subjected to filtration with a 1-μm filter, and the filtrate was collected to obtain an aqueous dispersion of self-dispersing polymer particles B-01 having a solid concentration of 26.5%. The obtained self-dispersing polymer particles were diluted with ion-exchange water to give a dispersion (25.0%). The volume average particle diameter of the diluted liquid was 3.0 nm.

<Measurement of Volume Average Particle Diameter Mv>

The obtained aqueous dispersions of the self-dispersing polymer particles were diluted to have a concentration suitable for the measurement (with a loading index in the range of from 0.1 to 10), and the volume average particle diameter was measured by a dynamic light scattering method using a ultrafine particle size distribution analyzer (NANOTRAC UPA-EX150, trade name, manufactured by Nikkiso Co., Ltd.) The measurement of the volume average particle diameter of each aqueous dispersion was conducted under the same measurement condition. Specifically, the measurement was conducted under the following conditions:

Particle transparency: transparent
Particle refraction index: 1.51
Particle shape: non-spherical
Density: 1.2 g/cm$^3$
Solvent: water
Cell temperature: 18° C. to 25° C.

Preparation of Cyan Ink

The following components were mixed and charged into a plastic disposable syringe, and filtrated with a 5-μm PVDF filter (MILLEX-SV, trade name, diameter: 25 mm, manufactured by Millipore Corporation) to obtain a cyan ink C-01.

—Formulation of Cyan Ink—
Cyan pigment (Pigment Blue 15:3): 2.5%
Polymer dispersant P-1 (solid content): 1.25%
Polymer particles B-01 (solid content): 8.5%
SANNIX GP (trade name, water-soluble organic solvent, manufactured by Sanyo Chemical Industries, Ltd.): 10%
Tripropylene glycol monomethyl ether (TPGmME) (MFTG, manufactured by Nippon Nyukazai Co., Ltd.): 2%
Dipropylene glycol (water-soluble organic solvent, manufactured by Wako Pure Chemical Industries Co., Ltd.): 4%
Urea (solid wetting agent, manufactured by Nissan Chemical Industries, Ltd.): 5%
OLFINE E1010 (trade name, surfactant, manufactured by Nisshin Chemical Co., Ltd.): 1.5%
Wax particles (particles of a mixture containing carnauba: paraffin=9:1, volume average particle diameter: 90 nm): 2%
Ion-exchanged water: balance Preparation of Magenta Ink The following components were mixed and charged into a plastic disposable syringe, and filtrated with a 5-μm PVDF filter (MILLEX-SV, trade name, diameter: 25 mm, manufactured by Millipore Corporation) to obtain a magenta ink M-01.

—Formulation of Magenta Ink—
Magenta pigment (Pigment Red 122): 6.7%
Polymer dispersant P-1 (solid content): 3.4%
Polymer particles B-01 (solid content): 5.2%
SANNIX GP (trade name, water-soluble organic solvent, manufactured by Sanyo Chemical Industries, Ltd.): 10%
Tripropylene glycol monomethyl ether (TPGmME) (MFTG, manufactured by Nippon Nyukazai Co., Ltd.): 2%
Dipropylene glycol (water-soluble organic solvent, manufactured by Wako Pure Chemical Industries Co., Ltd.): 4%
Urea (solid wetting agent, manufactured by Nissan Chemical Industries, Ltd.): 5%
OLFINE E1010 (surfactant, manufactured by Nisshin Chemical Co., Ltd.): 1.5%
Wax particles (particles of a mixture containing carnauba: paraffin=9:1, volume average particle diameter: 90 nm): 2%
Ion-exchanged water: balance Preparation of Yellow Ink The following components were mixed and charged into a plastic disposable syringe, and filtrated with a 5-μm PVDF filter (trade name, MILLEX-SV, diameter: 25 mm, manufactured by Millipore Corporation) to obtain a yellow ink Y-01.

—Formulation of Yellow Ink—
Yellow pigment (Pigment Yellow 74): 4.0%
Polymer dispersant P-1 (solid content): 1.6%
Polymer particles B-01 (solid content): 7.0%
SANNIX GP (trade name, water-soluble organic solvent, manufactured by Sanyo Chemical Industries, Ltd.): 10%
Tripropylene glycol monomethyl ether (TPGmME) (MFTG, manufactured by Nippon Nyukazai Co., Ltd.): 2%
Dipropylene glycol (water-soluble organic solvent, manufactured by Wako Pure Chemical Industries Co., Ltd.): 4%
Urea (solid wetting agent, manufactured by Nissan Chemical Industries, Ltd.): 5%
OLFINE E1010 (surfactant, manufactured by Nisshin Chemical Co., Ltd.): 1.0%

Wax particles (particles of a mixture containing carnauba: paraffin=9:1, volume average particle diameter: 90 nm): 2%

Ion-exchanged water: balance

Preparation of Black Ink

The following components were mixed and charged into a plastic disposable syringe, and filtrated with a 5-μm-PVDF filter (trade name, MILLEX-SV, diameter: 25 mm, manufactured by Millipore Corporation) to obtain a black ink K-01.

—Formulation of Black Ink—

Black pigment (carbon black): 3.0%

Polymer dispersant P-1 (solid content): 0.9%

Polymer particles B-01 (solid content): 7.0%

SANNIX GP (trade name, water-soluble organic solvent, manufactured by Sanyo Chemical Industries, Ltd.): 10%

Tripropylene glycol monomethyl ether (TPGmME) (MFTG, manufactured by Nippon Nyukazai Co., Ltd.): 2%

Dipropylene glycol (water-soluble organic solvent, manufactured by Wako Pure Chemical Industries Co., Ltd.): 4%

Urea (solid wetting agent, manufactured by Nissan Chemical Industries, Ltd.): 5%

OLFINE E1010 (surfactant, manufactured by Nisshin Chemical Co., Ltd.): 1.0%

Wax particles (particles of a mixture containing carnauba: paraffin=9:1, volume average particle diameter: 90 nm): 2%

NEWPOL PE-108 (trade name, thickener, manufactured by Sanyo Chemical Industries, Ltd.): 0.2%

SNOWTEX XS (trade name, colloidal silica, manufactured by Nissan Chemical Industries, Ltd.): 0.05%

Ion-exchanged water: balance

The wax particles described in the Examples were prepared by coemulsification so as to have the ratio shown in the following Table 1.

Ink set 1 was obtained from the cyan ink, the magenta ink, the yellow ink and the black prepared in the above processes.

Ink sets 2 to 17, shown in Table 1, were obtained in a similar manner to ink set 1, except that the kind, the formulation ratio, and the addition amount of the cyan ink, the magenta ink, the yellow ink and the black ink were changed as shown in Table 1.

<Preparation of Treatment Liquid>

A treatment liquid was prepared as follows. The viscosity of the treatment liquid was measured by using an E-type viscometer (manufactured by Toki Sangyo Co., Ltd.) The surface tension is measured at 25° C. using an automatic surface tensiometer CBVP-Z (trade name, manufactured by Kyowa Interface Science Co., Ltd.)

—Treatment Liquid T-1—

Malonic acid: 6.3%

Malic acid: 6.4%

Phosphoric acid (purity: 85%): 3.8%

Benzotriazole: 1.0%

Diethyleneglycol monobutylether: 4.0%

Tripropyleneglycol monomethylether: 4.0%

Ion-exchanged water: balance

The treatment liquid had a pH of 1.1, a viscosity of 1.9 mPa·s, and a surface tension of 41.5 mN/m.

—Evaluation of Separation Resistance of Ink—

A dispersion stability analyzer LUMISIZER (trade name, manufactured by L.U.M.) was employed for the evaluation of separation properties of the ink. 0.4 g of the cyan ink was added into a sample tube made of polycarbonate and subjected to centrifugation at a rotation number of 4,000 rpm for 950 minutes at 25° C. The sample tube was kept in a vertical position on a laboratory table, and whether or not a white turbidity was floating on a surface of the ink composition in the sample tube was visually observed. The result of the observation was evaluated in accordance with the following evaluation criteria. The evaluation results are shown in Table 1.

Evaluation Criteria

AA: No white turbidity is observed on a surface 5 minutes after the centrifugation.

A: No white turbidity is observed on a surface 15 minutes after the centrifugation.

B: A slight amount of white turbidity is observed on a surface 15 minutes after the centrifugation.

C: A white turbidity is clearly observed on the surface 15 minutes after the centrifugation.

The same evaluation was carried out using the magenta ink, the yellow ink and the black ink. The results were similar to that of the cyan ink.

—Image Forming Method—

Image formation was carried out using ink sets 1 to 7 with an inkjet recording apparatus described below.

The ejection was performed at a resolution of 1,200 dpi× 1,200 dpi and an amount per drop of 2 to 6 pL, onto a recording medium (OK TOP COAT PLUS, trade name, basis weight: 154 g/m$^2$, manufactured by Oji Paper Co., Ltd.).

Figure 1:
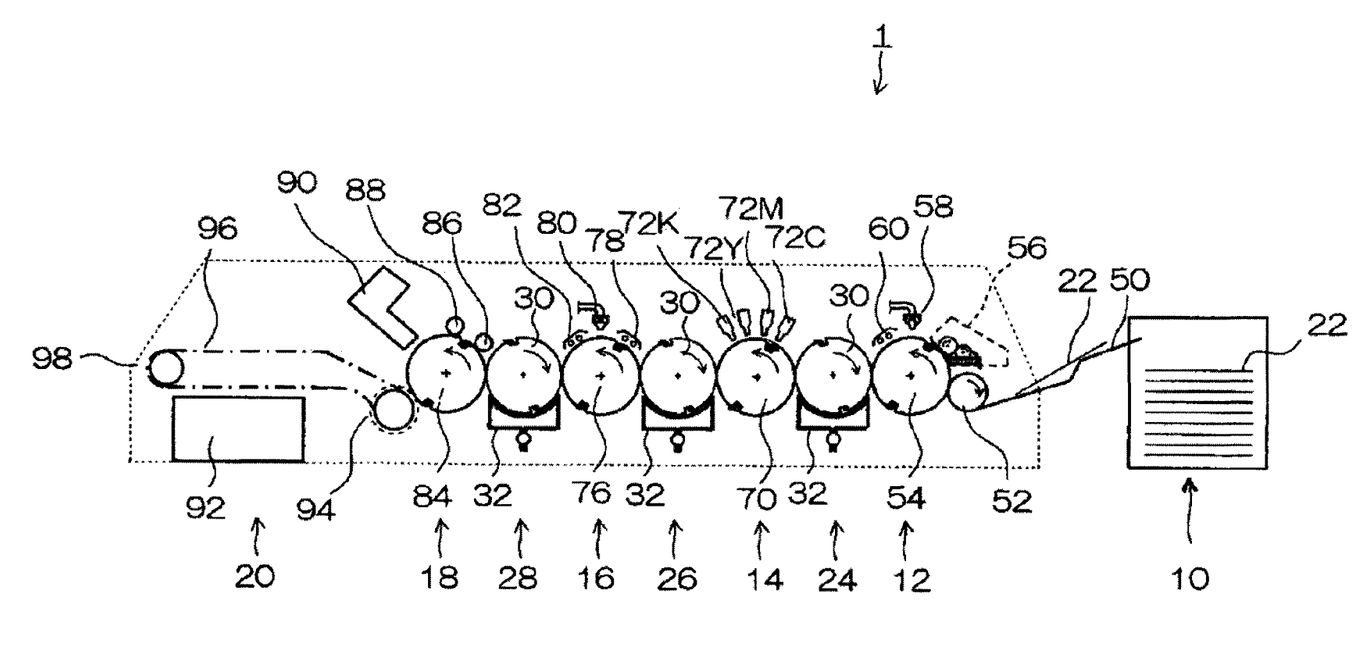
FIG. 1 is a schematic view showing the entire body of an ink jet recording apparatus according to an exemplary embodiment of the invention.

As shown in FIG. 1, a recording medium 22 was fed from a paper feed section 10 of an inkjet recording apparatus 1 towards a printing drum 70, and the entire surface of the recording medium 22 was coated with a thin layer (2 μm in thickness) of the treatment liquid T-1 with a treatment liquid coating apparatus 56, on a treatment liquid drum 54 (diameter: 450 mm). A gravure coater was used as the treatment liquid coating apparatus 56.

Subsequently, the recording medium 22 coated with the treatment liquid T-1 was subjected to a drying treatment by a warm air blowing nozzle 58 (blowing a warm air having a temperature of 70° C. at a rate of 9 m$^3$/minute) and an IR heater 60 (180° C.), thereby drying part of the solvent contained in the treatment liquid.

The recording medium 22 was conveyed, via a first intermediate conveyance portion 24, to a printing section 14, at which aqueous inks of CMYK (cyan, magenta, yellow and black) were ejected from heads 72K, 72Y, 72M and 72C, according to image signals for solid images of respective colors, and the inks were deposited onto the recording medium 22. The volume (per dot) of the ink ejected was 2 pL at high-light portions, and 6 pL at high-concentration portions. The recording density was 1,200 dpi at a main scanning direction and a sub-scanning direction, respectively. When a nozzle was clogged, a treatment for making the uneven streaks difficult to be seen was performed by ejecting ink in an amount of 6 pL from an adjacent nozzle. Since the treatment liquid drum 54 and a drying drum 76 were provided as independent members from the printing drum 70, adverse effects by heat or air from these members could be suppressed even when the drying of the treatment liquid was performed at high speed, and stable ejection could be achieved.

Thereafter, the recording medium 22 was dried on the drying drum 76, using a first IR heater 78 (surface temperature: 180° C.), a warm air blowing nozzle 80 (blowing 70° C. warm air a rate of 12 m$^3$/minute), and a second IR heater 82 (surface temperature: 180° C.). The drying time was approximately 2 seconds.

Then, the image formed on the recording medium 22 was thermally fixed by a fixing drum 84 at 50° C., a first fixing roller 86 at 80° C., and a second fixing roller 88 at 80° C., at a nip pressure of 0.30 MPa. A roller formed of a metal core with a 6 mm-thick silicone rubber coating having a hardness of 30 degrees and a 50-μm thick soft PFA coating, which exhibited excellent tight-contact properties with an ink image and excellent detachability from an ink image, was used for the first fixing roller 86 and the second fixing roller 88.

The recording medium 22 was conveyed at a conveyance velocity of 535 mm/s by drums 54, 70, 76 and 84.

An evaluation sample of the image-formed recording medium was obtained through the above processes.

—Evaluation of Blocking Immediately after Image Formation—

Through performing the above processes, one-side successive printing was carried out on 2,000 sheets. After allowing the printed samples to stand under the conditions of 25° C. and 60% RH for one hour, printing was further carried out on the backside of the printed materials in a manner substantially similar to the above, whereby double-sided printing was carried out.

The 2,000 sheets of the printed materials being stacked in a tray were stored under the conditions of 25° C. and 60% RH for 24 hours, and occurrence of blocking between the 350th sheet and the 351st sheet of the printed materials were evaluated according to the following criteria.

Evaluation Criteria

A: No sticking is felt when peeling the paper surfaces, and no adherence of paper is visually observed.

B: An adhesive portion is found in a small portion of the printed surface (approximately one portion in an area of 10 cm$^2$), and adherence of paper is visually recognized.

C: Adhesion occurs at the entire printed surface, and adherence of paper is recognized at the entire region.

—Evaluation of Rubbing Resistance—

The surface of the sample on which the image was printed was rubbed in a back-and-forth manner three times with a weight (470 g by mass, 15 mm×30 mm×120 mm) wrapped with an unprinted paper ((N) SILVER DIA, trade name, basis weight: 104.7 g/m2, manufactured by Nippon Paper Industries Co., Ltd.) cut into a size of 10 mm×50 mm.

The contact area of the unprinted SILVER DIA and the sample was 150 mm$^2$, and the load applied to the sample was equivalent to 260 Kg/m$^2$. The printed surface of the sample after being rubbed was visually observed, and evaluated in accordance with the following evaluation criteria.

Evaluation Criteria

AA: No stripping-off of an image (colorant) from printed surface was observed.

A: No stripping-off of an image (colorant) from printed surface was observed, although transfer of the colorant was observed on the paper used for rubbing.

B: A slight stripping-off of an image (colorant) from printed surface was observed, but was an acceptable level.

C: Stripping-off of an image (colorant) from printed surface, which was problematic for practical applications, was clearly observed.

TABLE 1

| No. | Ink set Ink composition | | | | Wax Kind | Difference in Specific gravity | Mixing ratio | Addition amount | Separation resistance of Ink | Blocking immediately after image formation | Rubbing resistance | Remarks |
|---|---|---|---|---|---|---|---|---|---|---|---|---|
| 1 | C-01 | M-01 | Y-01 | K-01 | A/B | 0.11 | 9:1 | 2% | AA | B | B | The invention |
| 2 | C-02 | M-02 | Y-02 | K-02 | A/B | 0.11 | 1:0 | 2% | AA | C | B | Comparative |
| 3 | C-03 | M-03 | Y-03 | K-03 | A/B | 0.11 | 4:1 | 2% | AA | A | A | The invention |
| 4 | C-04 | M-04 | Y-04 | K-04 | A/B | 0.11 | 3:1 | 2% | AA | A | AA | The invention |
| 5 | C-05 | M-05 | Y-05 | K-05 | A/B | 0.11 | 1:1 | 2% | A | A | AA | The invention |
| 6 | C-06 | M-06 | Y-06 | K-06 | A/B | 0.11 | 1:4 | 2% | A | A | AA | The invention |
| 7 | C-07 | M-07 | Y-07 | K-07 | A/B | 0.11 | 1:9 | 2% | B | A | AA | The invention |
| 8 | C-08 | M-08 | Y-08 | K-08 | A/B | 0.11 | 0:1 | 2% | C | A | AA | Comparative |
| 9 | C-09 | M-09 | Y-09 | K-09 | A/B | 0.11 | 1:1 | 1% | AA | A | A | The invention |
| 10 | C-10 | M-10 | Y-10 | K-10 | A/B | 0.11 | 1:1 | 3% | A | A | AA | The invention |
| 11 | C-11 | M-11 | Y-11 | K-11 | A/B | 0.11 | 1:1 | 4% | B | A | AA | The invention |
| 12 | C-12 | M-12 | Y-12 | K-12 | C/B | 0.08 | 1:1 | 2% | A | A | AA | The invention |
| 13 | C-13 | M-13 | Y-13 | K-13 | C/D | 0.08 | 1:1 | 2% | A | A | AA | The invention |
| 14 | C-14 | M-14 | Y-14 | K-14 | A B | 0.11 | 1 1 | 1% 1% | C | A | A | Comparative |
| 15 | C-15 | M-15 | Y-15 | K-15 | A B | 0.11 | 1 1 | 1.34% 0.66% | C | A | A | Comparative |
| 16 | C-16 | M-16 | Y-16 | K-16 | A/C | 0.03 | 1:1 | 2% | AA | B | B | The invention |
| 17 | C-17 | M-17 | Y-17 | K-17 | B/D | 0.02 | 1:1 | 2% | B | A | AA | The invention |

A: Carnauba wax, Specific gravity: 1.00, Melting temperature: 83° C.
B: Paraffin wax, Specific gravity: 0.89, Melting temperature: 68° C.
C: Stearic acid amide wax, Specific gravity: 0.97, Melting temperature: 100° C.
D: Polyethylene, Specific gravity: 0.91, Melting temperature: 102° C.

As shown in Table 1, it is found that the ink composition according to the present invention exhibits excellent ink separation resistance (storage stability), and the image formed by using an ink set including the ink composition exhibits excellent blocking resistance and rubbing resistance immediately after the formation of the image.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a colorant, water and wax particles, the wax particles comprising at least two kinds of wax including a first wax and a second wax, wherein:

the difference between the specific gravity of the first wax and the specific gravity of the second wax is from 0.05 to 0.15;

the mass ratio of the first wax to the second wax is from 1:4 to 4:1;

the first wax has a specific gravity of 0.95 or less and the second wax has a specific gravity of not less than 0.95; and the first wax comprises at least one selected from the group consisting of a paraffin wax and a polyethylene wax, and the second wax comprises at least one selected from the group consisting of carnauba wax and a stearic acid amide wax.

2. The ink composition according to claim 1, further comprising polymer particles.

3. The ink composition according to claim 1, wherein the colorant is a pigment.

4. An ink set comprising the ink composition according to claim 1, the ink composition having a color selected from the group consisting of cyan, magenta, yellow and black.

5. The ink set according to claim 4, further comprising a treatment liquid comprising an aggregation component that aggregates the ink composition upon contact with the ink composition.

6. An image forming method comprising:
applying the ink composition according to claim 1 onto a recording medium; and
applying a treatment liquid onto the recording medium, the treatment liquid comprising an aggregation component that aggregates the ink composition upon contact with the ink composition.

7. The image forming method according to claim 6, further comprising thermally fixing an image formed by applying the ink composition and the treatment liquid.

8. The ink composition according to claim 1, wherein the first wax is a paraffin wax, and the second wax is carnauba wax.

9. The ink composition according to claim 1, wherein the wax particles are formed by co-emulsification of the at least two kinds of wax.

* * * * *